(12) United States Patent
Harada et al.

(10) Patent No.: US 8,238,305 B2
(45) Date of Patent: Aug. 7, 2012

(54) TRANSMISSION RESTARTING METHOD AND RADIO BASE STATION

(75) Inventors: Atsushi Harada, Kawasaki (JP); Anil Umesh, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 335 days.

(21) Appl. No.: 12/532,744

(22) PCT Filed: Mar. 21, 2008

(86) PCT No.: PCT/JP2008/055324
§ 371 (c)(1),
(2), (4) Date: Nov. 16, 2009

(87) PCT Pub. No.: WO2008/117762
PCT Pub. Date: Oct. 2, 2008

(65) Prior Publication Data
US 2010/0124932 A1    May 20, 2010

(30) Foreign Application Priority Data
Mar. 23, 2007 (JP) ................................. 2007-077973

(51) Int. Cl.
*H04W 4/00* (2009.01)
(52) U.S. Cl. .......................... 370/330; 370/401; 370/437
(58) Field of Classification Search .......................... None
See application file for complete search history.

(56) References Cited

U.S. PATENT DOCUMENTS

| 7,631,239 B2 * | 12/2009 | Yeo et al. | 714/748 |
| 2005/0190720 A1 * | 9/2005 | Miyake et al. | 370/328 |
| 2008/0225802 A1 * | 9/2008 | Sun et al. | 370/336 |

FOREIGN PATENT DOCUMENTS

| JP | 6-37728 A | 2/1994 |
| JP | 2006-67089 A | 3/2006 |
| WO | 2005/064840 A1 | 7/2005 |
| WO | WO 2005/064840 | * 7/2005 |

OTHER PUBLICATIONS

International Search Report w/translation from PCT/JP2008/055324 dated May 20, 2008 (2 pages).
Written Opinion from PCT/JP2008/055324 dated May 20, 2008 (3 pages).
3GPP TSG RAN WG2 #57, R2-070781; "Uplink synchronization"; NTT DoCoMo, Inc.; St. Louis, US, Feb. 12-16, 2007 (3 pages).
Patent Abstracts of Japan; Publication No. 2006-067089 dated Mar. 9, 2006; Toshiba Corp. (1 page).
Patent Abstracts of Japan; Publication No. 06-037728 dated Feb. 10, 1994; NEC Corp. (1 page).
Office Action for Chinese Patent Application No. 200880009518.4 issued Apr. 5, 2012, with English translation thereof (7 pages).

* cited by examiner

*Primary Examiner* — Bob Phunkulh
(74) *Attorney, Agent, or Firm* — Osha Liang LLP

(57) ABSTRACT

In a transmission restarting method of restarting transmission of downlink user data to a mobile station (UE) in a discontinuous reception state; a radio base station (eNB) allocates a radio resource for downlink data transmission to the mobile station (UE), and notifies, to the mobile station (UE), the allocated radio resource for downlink data transmission; the radio base station (eNB) restarts transmission of downlink user data to the mobile station (UE) by using the allocated radio resource for downlink data transmission; and the radio base station (eNB) stops transmission of the downlink user data when a predetermined condition is detected.

10 Claims, 12 Drawing Sheets

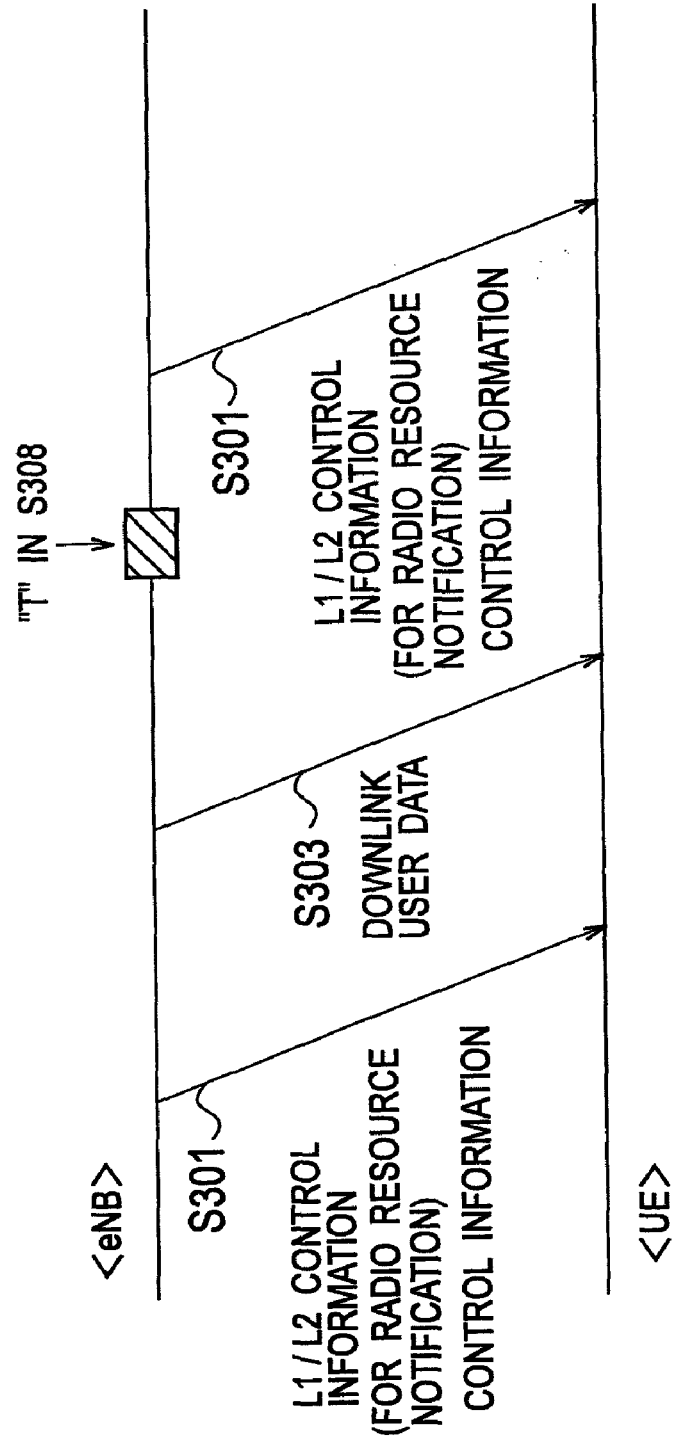

TRANSMISSION RESTARTING METHOD AND RADIO BASE STATION

TECHNICAL FIELD

The present invention relates to a transmission restarting method and a radio base station for restarting transmission of downlink user data to a mobile station in a discontinuous reception state.

BACKGROUND ART

In recent years, there has been known a technique by which a mobile station UE performs "discontinuous reception" of downlink data, in order to save its own battery, in a radio access scheme such as "LTE (long term evolution)", the 3GPP standardization of which is underway.

In this radio access scheme, it is not always necessary to maintain uplink synchronization between the mobile station UE in a discontinuous reception state and a radio base station eNB.

Accordingly, this radio access scheme is configured to establish uplink synchronization between the radio base station eNB and the mobile station UE, as shown in FIG. 1, when downlink user data for the mobile station UE in the discontinuous reception state occurs and when uplink synchronization is not maintained between the mobile station and the radio base station eNB.

To be more precise, as shown in FIG. 1, in Step S3001, the radio base station eNB transmits "UL synch request (an uplink synchronization request)" to the mobile station UE, in order to establish uplink synchronization between the radio base station eNB and the mobile station UE.

In Step S3002, using an asynchronous RACH (random access channel), the mobile station UE transmits a dedicated preamble designated by the above-mentioned "UL synch request".

Here, the dedicated preamble means a data series which is individually allocated to each mobile station. Note that the "UL synch request" does not include the dedicated preamble itself but includes an identifier for identifying the dedicated preamble.

In Step S3003, in response to the dedicated preamble transmitted from the mobile station UE, the radio base station eNB creates a TA (Timing Advance) command for adjusting uplink transmission timing for the mobile station UE and transmits the TA command to the mobile station UE.

However, the mobile station UE fails to receive the TA command and therefore retransmits the above-described dedicated preamble by using the asynchronous RACH in Step S3004.

In Step S3005, the radio base station eNB creates a TA command in response to the dedicated preamble retransmitted from the mobile station UE and transmits the TA command to the mobile station UE.

Thereafter, in Step S3006, the radio base station eNB determines that uplink synchronization is established since having received no dedicated preamble from the mobile station UE for a predetermined period. Then, the radio base station eNB transmits the above-mentioned downlink user data to the mobile station UE by using a DL-SCH (downlink shared data channel: Downlink-Shared Channel).

Non-patent Document 1: 3GPP TSG RAN WG2 #57, R2-070781

DISCLOSURE OF THE INVENTION

However, the conventional radio access scheme has the following problem. Specifically, when receiving no dedicated preamble from the mobile station UE after transmission of the TA command, the radio base station eNB cannot determine whether it is a "normal state" where the mobile station UE normally receives the TA command and uplink synchronization is established, or it is a "semi-normal state" where the mobile station UE fails to normally receive the TA command and uplink synchronization is not established.

Here, with reference to FIG. 2, a description will be given of an example of a case where the above-described "semi-normal state" occurs.

As shown in FIG. 2, in Step S4001, the radio base station eNB transmits "UL synch request (the uplink synchronization request)" to the mobile station UE.

In Step S4002, using the asynchronous RACH, the mobile station UE transmits the dedicated preamble designated by the above-described "UL synch request".

In Step S4003, the radio base station eNB creates a TA command in response to the dedicated preamble transmitted from the mobile station UE, and transmits the TA command to the mobile station UE.

However, the mobile station UE fails to receive the TA command and therefore retransmits the above-described dedicated preamble by using the asynchronous RACH, in Step S4004.

In Step S4005, the radio base station eNB creates a TA command in response to the dedicated preamble retransmitted from the mobile station UE, and transmits the TA command to the mobile station UE.

In Step S4006, the mobile station UE fails to receive the TA command again and therefore retransmits the above-described dedicated preamble by using the asynchronous RACH.

However, the radio base station eNB fails to receive the dedicated preamble retransmitted from the mobile station UE this time, and does not receive the dedicated preamble from the mobile station UE for a predetermined period. Thereby, the radio base station eNB determines that uplink synchronization is established.

In other words, in Step S4007, the radio base station eNB determines that uplink synchronization is established (it is in the "normal state") though the uplink synchronization is not established (though it is in the "semi-normal state"), and starts transmission of the above-mentioned downlink user data by using the DL-SCH. This is not normal restart of transmission of the downlink user data.

Therefore, the present invention has been made in view of the above-described problem. An object of the present invention is to provide a transmission restarting method and a radio base station which enable restart of transmission of downlink user data to a mobile station in a discontinuous reception state.

A first aspect of the present invention is summarized as a transmission restarting method of restarting transmission of downlink user data to a mobile station in a discontinuous reception state, including the steps of: allocating, at a radio base station, a radio resource for downlink data transmission to the mobile station, and notifying, from the radio base station to the mobile station, the allocated radio resource for downlink data transmission; restarting, at the radio base station, transmission of downlink user data to the mobile station by using the allocated radio resource for downlink data transmission; and stopping, at the radio base station, transmission of the downlink user data when a predetermined condition is detected.

In the first aspect, the transmission restarting method can further include the steps of: transmitting, from the radio base station to the mobile station, an uplink synchronization request by using the allocated radio resource for downlink data transmission, the uplink synchronization request designating a data series allocated for identifying the mobile station; notifying, from the mobile station to the radio base station, the data series designated by the uplink synchronization request, when successfully receiving the uplink synchronization request; transmitting, from the radio base station to the mobile station, a command for adjusting uplink transmission timing by using the allocated radio resource for downlink data transmission when receiving the data series from the mobile station; restarting, at the radio base station, transmission of the downlink user data to the mobile station by using the allocated radio resource for downlink data transmission, when not receiving the data series from the mobile station until a predetermined period is passed after transmission of the command; and stopping, at the radio base station, transmission of the downlink user data, and transmitting, at the radio base station, any of the uplink synchronization request and the command when the predetermined condition is detected.

In the first aspect, the radio base station can determine that the predetermined condition is detected, when transmission acknowledgment information in a HARQ process for the downlink user data is not received from the mobile station a predetermined number of times after restart of transmission of the downlink user data.

In the first aspect, the radio base station can determine that the predetermined condition is detected, when the data series is received from the mobile station after restart of transmission of the downlink user data.

In the first aspect, the radio base station can stop transmission of the downlink user data and transmits the command, when the predetermined condition is detected and when a predetermined timer has not expired.

In the first aspect, the radio base station can stop transmission of the downlink user data and transmits the uplink synchronization request, when the predetermined condition is detected and when a predetermined timer has expired.

In the first aspect, the data series can be a preamble for a random access channel; and the mobile station can notify, to the radio base station, the preamble designated by the uplink synchronization request by using the random access channel, when successfully receiving the uplink synchronization request.

A second aspect of the present invention is summarized as a radio base station configured to restart transmission of downlink user data to a mobile station in a discontinuous reception state, wherein the radio base station is configured to: allocate a radio resource for downlink data transmission to the mobile station, and notify, to the mobile station, the allocated radio resource for downlink data transmission; restart transmission of downlink user data to the mobile station by using the allocated radio resource for downlink data transmission; and stop transmission of the downlink user data, when a predetermined condition is detected.

In the second aspect, the radio base station can be configured to: transmit, to the mobile station, an uplink synchronization request by using the allocated radio resource for downlink data transmission, the uplink synchronization request designating a data series allocated for identifying the mobile station; transmit, to the mobile station, a command for adjusting uplink transmission timing by using the allocated radio resource for downlink data transmission, when receiving the data series from the mobile station; restart transmission of the downlink user data to the mobile station by using the allocated radio resource for downlink data transmission, when not receiving the data series from the mobile station until a predetermined period is passed after transmission of the command; and stop transmission of the downlink user data, and transmit any of the uplink synchronization request and the command, when the predetermined condition is detected.

In the second aspect, the radio base station can be configured to determine that the predetermined condition is detected, when transmission acknowledgment information in a HARQ process for the downlink user data is not received from the mobile station a predetermined number of times after restart of transmission of the downlink user data.

In the second aspect, the radio base station can be configured to determine that the predetermined condition is detected, when the data series is received from the mobile station after restart of transmission of the downlink user data.

In the second aspect, the radio base station can be configured to stop transmission of the downlink user data, and to transmit the command, when the predetermined condition is detected and when a predetermined timer has not expired.

In the second aspect, the radio base station can be configured to stop transmission of the downlink user data, and to transmit the uplink synchronization request, when the predetermined condition is detected and when a predetermined timer has expired.

In the second aspect, the data series can be a preamble for a random access channel.

As described above, according to the present invention, it is possible to provide a transmission restarting method and a radio base station, which enable restart of transmission of downlink user data to a mobile station in a discontinuous reception state.

BRIEF DESCRIPTION OF THE DRAWINGS

FIG. 14 is a sequence diagram showing operations of a mobile communication system according to Modified example 1 of the present invention.

BEST MODE FOR CARRYING OUT THE INVENTION (Configuration of Mobile Communication System According to First Embodiment of the Present Invention)

A configuration of a mobile communication system according to a first embodiment of the present invention will be described with reference to FIG. 3. In this embodiment, a mobile communication system applying a radio access system defined by the LTE will be described as an example. However, the present invention is not limited to such mobile communication system and is also applicable to mobile communication systems applying other radio access systems.

Figure 1:
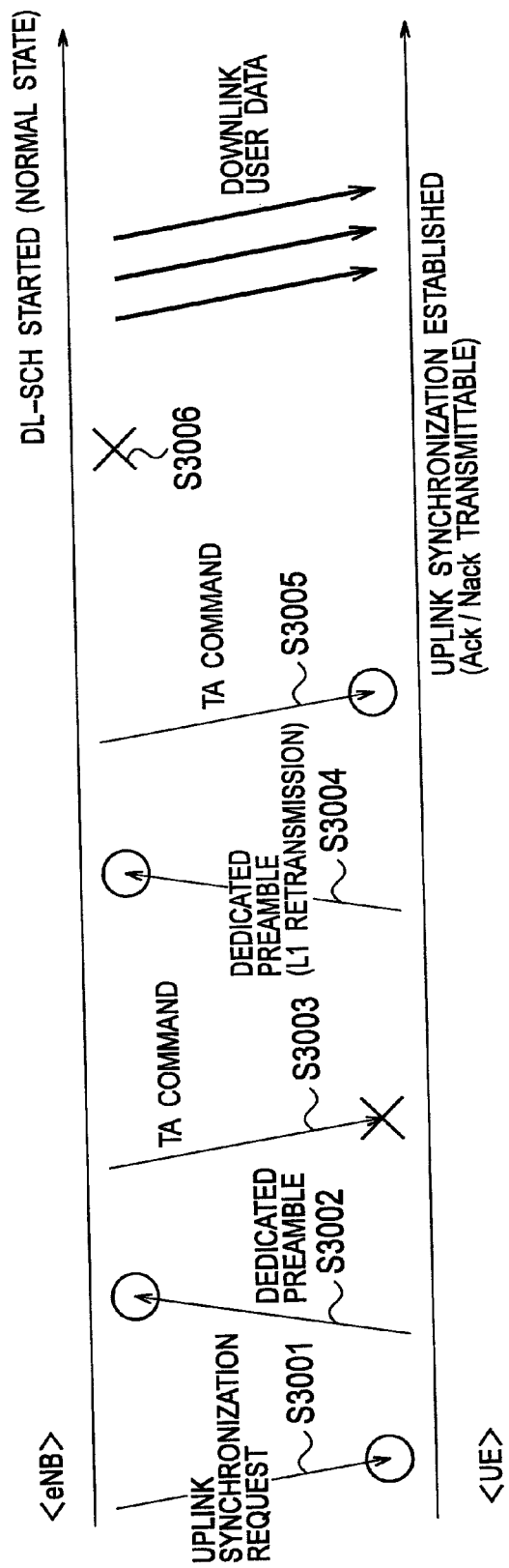
FIG. 1 is a view for explaining procedures for restart from a DRX state in a mobile communication system according to a conventional technique.
Figure 2:
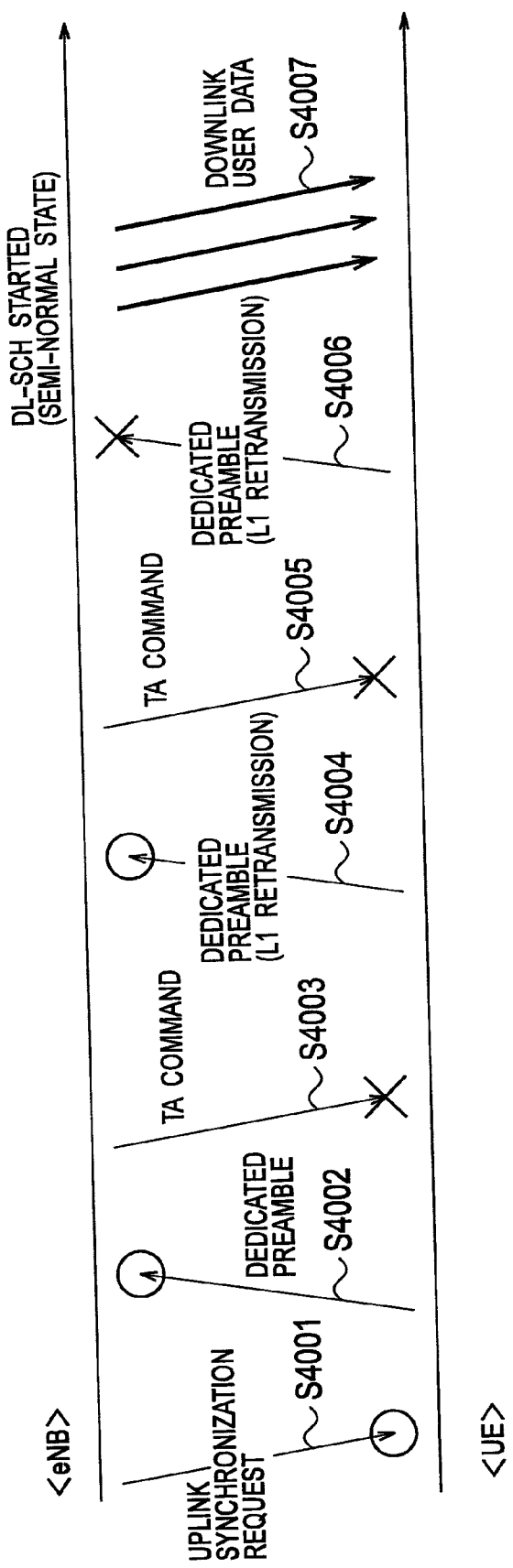
FIG. 2 is a view for explaining procedures for restart from the DRX state in the mobile communication system according to the conventional technique.
Figure 3:
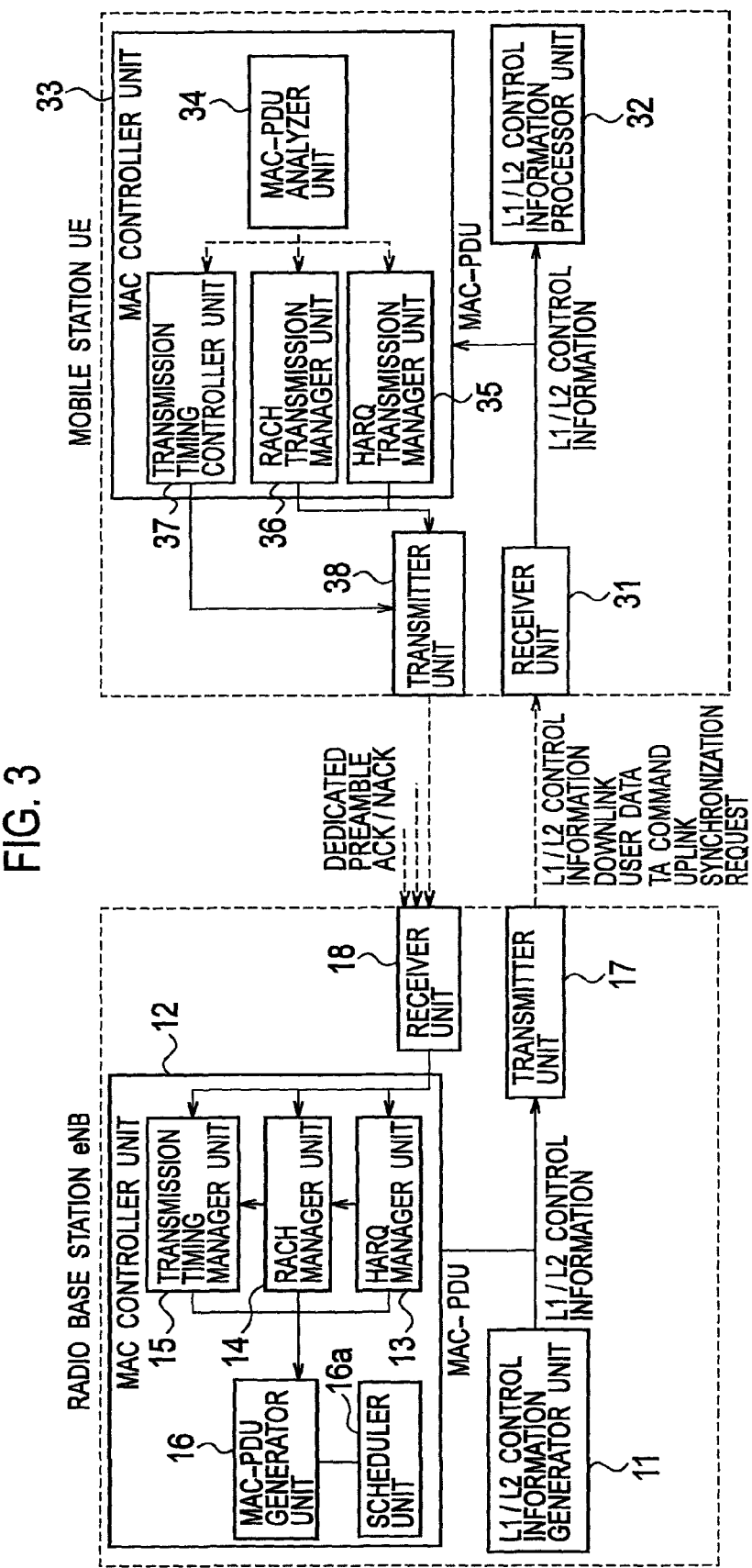
FIG. 3 is a functional block diagram of a radio base station and a mobile station according to a first embodiment of the present invention.

As shown in FIG. 3, the mobile communication system according to this embodiment includes a radio base station eNB and a mobile station UE. Moreover, the mobile communication system is configured to establish uplink synchronization when restarting transmission of downlink user data to the mobile station UE in a DRX state (a discontinuous reception state).

The radio base station eNB includes an L1/L2 control information generator unit 11, a MAC controller unit 12, a transmitter unit 17, and a receiver unit 18.

The L1/L2 control information generator unit 11 is configured to generate L1/L2 control information.

The L1/L2 control information includes, for example, radio resource notification control information for notifying of a radio resource for transmission of downlink data allocated to the mobile station UE.

The radio resource notification control information does not include a common identifier (RA-RNTI: Random Access-Radio Network Temporary Identifier) that is allocated to a response to a random access, but includes an identifier (C-RNTI: Cell-Radio Network Temporary Identifier) for individually identifying the mobile station UE within a cell. In other words, in this embodiment, the above-described allocation of the radio resource is executed by use of the C-RNTI instead of the RA-RNTI.

Moreover, in this embodiment, downlink data is assumed to correspond to a MAC-PDU and to include downlink user data to be transmitted by DCCH, DTCH or the like, a TA command, an uplink synchronization request, and so forth.

The MAC controller unit 12 includes a HARQ manager unit 13, a RACH manager unit 14, a transmission timing manager unit 15, a MAC-PDU generator unit 16, and a scheduler unit 16a.

The HARQ manager unit 13 is configured to perform retransmission control based on transmission acknowledgment information (ACK/NACK) of a HARQ process.

The RACH manager unit 14 is configured to allocate a dedicated preamble (a data series which is individually allocated to each mobile station UE and used for identifying the mobile station) to be transmitted by an asynchronous RACH, to the mobile station UE. Moreover, the RACH manager unit 14 is configured to identify the dedicated preamble included in the asynchronous RACH transmitted from the mobile station UE.

The transmission timing manager unit 15 is configured to create a TA command for adjusting uplink transmission timing in response to reception timing of the dedicated preamble notified by the mobile station UE, when receiving the dedicated preamble from the mobile station UE after an uplink synchronization request is transmitted by the transmitter 17.

Here, the uplink transmission timing includes transmission timing in an uplink control channel and in an uplink data channel.

The MAC-PDU generator unit 16 is configured to generate a MAC-PDU (downlink data) in a radio subframe to which a transmission opportunity is allocated by the scheduler unit 16a, in response to instructions and the like from the HARQ manager unit 13, the RACH manager unit 14, and the transmission timing manager unit 15.

To be more precise, the MAC-PDU generator unit 16 is configured to generate a MAC-PDU including downlink user data to be retransmitted in response to a retransmission control instruction from the HARQ manager unit 13.

Moreover, the MAC-PDU generator unit 16 is configured to generate a MAC-PDU including an uplink synchronization request that designates the dedicated preamble for the mobile station UE allocated by the RACH manager unit 14.

Here, the uplink synchronization request may be configured to designate the dedicated preamble for the mobile station UE by containing the dedicated preamble for the mobile station UE itself or to designate the dedicated preamble for the mobile station UE by containing an identifier for identifying the dedicated preamble for the mobile station US instead of containing the dedicated preamble for the mobile station UE itself.

In addition, the MAC-PDU generator unit 16 is configured to generate a MAC-PDU containing the TA command that is created by the transmission timing manager unit 15.

The transmitter unit 17 is configured to transmit L1/L2 control information by using an L1/L2 control channel (such as a PDCCH: Physical Downlink Control Channel) and to transmit a MAC-PDU including downlink user data, an uplink synchronization request, a TA command, and so forth by using a downlink data channel (such as a DL-SCH).

For example, the transmitter unit 17 is configured to notify a radio resource for downlink data transmission allocated to the mobile station UE, by using radio resource notification control information transmitted via the L1/L2 control channel.

Figure 6:
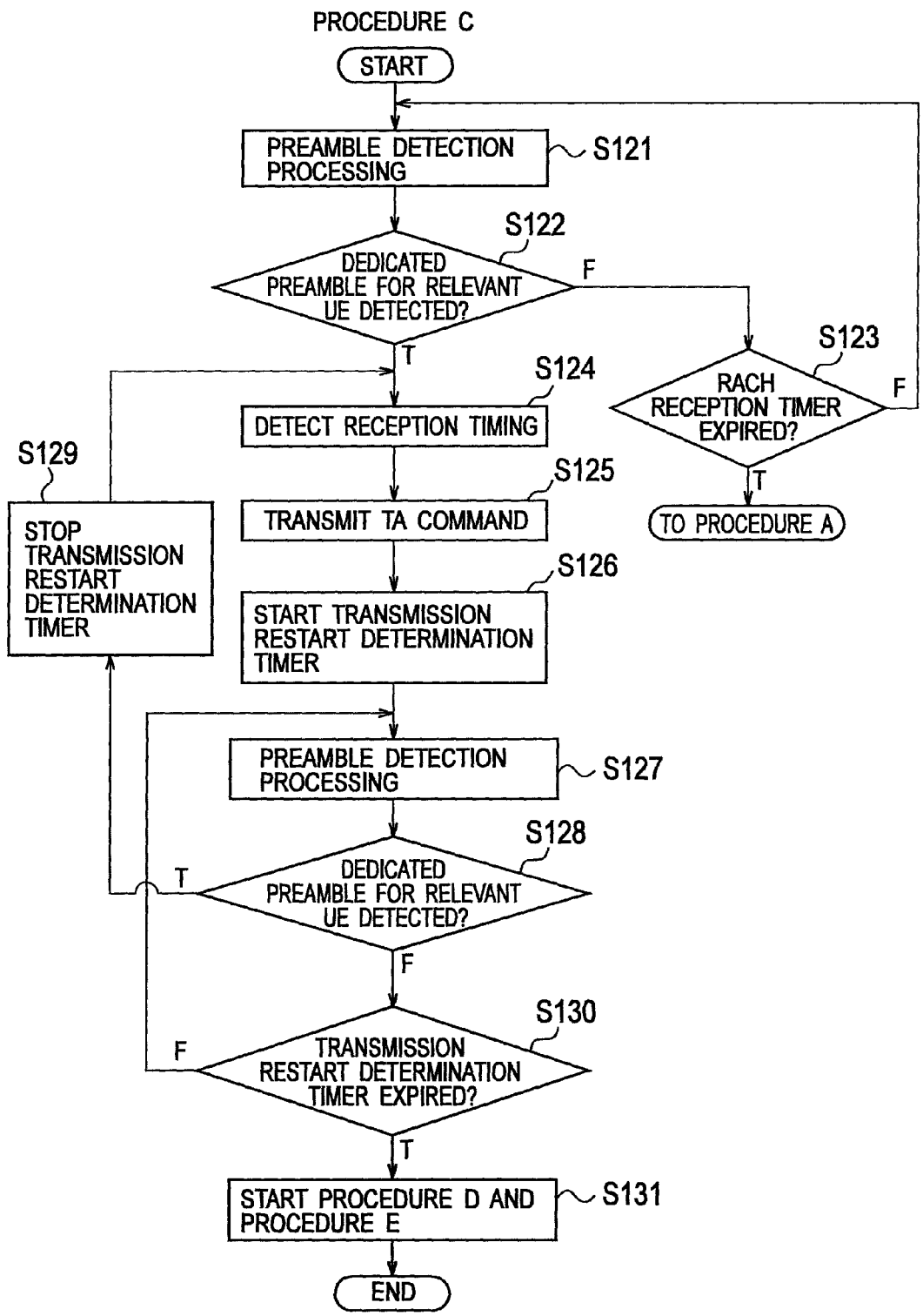
FIG. 6 is a flowchart showing operations in a procedure C performed by the radio base station according to the first embodiment of the present invention.

The transmitter unit 17 is configured to restart transmission of the MAC-PDU containing the downlink user data by using the radio resource for downlink data transmission allocated to the mobile station UE, when the RACH manager unit 14 does not receive a dedicated preamble from the mobile station UE until a lapse of a predetermined period (for example, until expiration of a transmission restart determination timer in FIG. 6) from transmission of a TA command.

Here, when a predetermined condition is detected, the transmitter unit 17 is configured to determine that uplink synchronization is not established (that it is in a "semi-normal state") and to stop transmission of the MAC-PDU containing the downlink user data.

In this respect, the transmitter unit 17 may be configured to determine that the above-mentioned predetermined condition is detected, when transmission acknowledgment information (ACK/NACK) in the HARQ process for the downlink user data is not received from the mobile station UE (when a DTX state is detected) for a predetermined number of times ("$M_2$" in FIG. 7) after restarting transmission of the downlink user data.

Moreover, the transmitter unit 17 may be configured to determine that the above-mentioned predetermined condition is detected, when a dedicated preamble is received from the mobile station UE after restarting transmission of the downlink user data.

Meanwhile, when the above-mentioned predetermined condition is detected, the transmitter unit 17 is configured to transmit an uplink synchronization request designating a newly allocated dedicated preamble or to transmit a newly created TA command by using the radio resource for downlink data transmission allocated to the mobile station UE.

Moreover, when the above-mentioned predetermined condition is detected and when a predetermined timer (a RACH reception timer in FIG. 5) has not expired, the transmitter unit 17 is configured to stop transmission of the downlink user data and to transmit a TA command by using the radio resource for downlink data transmission allocated to the mobile station UE.

On the other hand, when the above-mentioned predetermined condition is detected and when the predetermined timer (the RACH reception timer in FIG. 5) has expired, the transmitter unit 17 is configured to stop transmission of the downlink user data and to transmit an uplink synchronization request by using the radio resource for downlink data transmission allocated to the mobile station UE.

The receiver unit 18 is configured to receive a dedicated preamble for the mobile station UE and to receive transmission acknowledgment information in a HARQ process via an uplink channel (such as a PUCCH: Physical Uplink Control Channel or a PUSCH: Physical Uplink Shared Channel).

The mobile station UE includes a receiver unit 31, an L1/L2 control information processor unit 32, a MAC controller unit 33, and a transmitter unit 38. Here, the L1/L2 control information processor unit 32 and the MAC controller unit 33 may be realized by a chip that is mounted on the mobile station UE.

The receiver unit 31 is configured to receive L1/L2 control information via the L1/L2 control channel and to receive a MAC-PDU containing downlink user data, an uplink synchronization request, a TA command, and the like by using the downlink data channel.

The L1/L2 control information processor unit 32 is configured to perform predetermined L1/L2 control processing in accordance with the received L1/L2 control information.

The MAC controller unit 33 includes a MAC-PDU analyzer unit 34, a HARQ transmission manager unit 35, a RACH transmission manager unit 36, and a transmission timing controller unit 37.

The MAC-PDU analyzer unit 34 is configured to analyze the received MAC-PDU.

The HARQ transmission manager unit 35 is configured to manage transmission of transmission acknowledgment information (ACK/NACK) in a HARQ process in accordance with a result of analysis of the MAC-PDU performed by the MAC-PDU analyzer unit 34.

The RACH transmission controller unit 36 is configured to manage transmission of an asynchronous RACH in accordance with the analysis result of the MAC-PDU by the MAC-PDU analyzer unit 34.

To be more precise, when the uplink synchronization request from the radio base station eNB is received, the RACH transmission manager unit 36 is configured to instruct the transmitter unit 38 to transmit the dedicated preamble designated in the uplink synchronization request by using the asynchronous RACH.

Meanwhile, when the TA command from the radio base station eNB is not received for a predetermined period, the RACH transmission manager unit 36 is configured to instruct the transmitter unit 38 to transmit the dedicated preamble designated in the uplink synchronization request again by using the asynchronous RACH.

The transmission timing controller unit 37 is configured to control uplink transmission timing (such as transmission timing for an uplink data channel and an uplink control channel) in accordance with the analysis result of the MAC-PDU by the MAC-PDU analyzer unit 34.

To be more precise, the transmission timing controller unit 37 is configured to establish uplink synchronization by controlling the uplink transmission timing in accordance with the TA command and the like transmitted by the radio base station eNB.

The transmitter unit 38 is configured to transmit the dedicated preamble for the mobile station UE via the asynchronous RACH in response to instructions from the HARQ transmission manager unit 35, the RACH transmission manager unit 36, and the transmission timing controller unit 37, and to transmit the transmission acknowledgment information (ACK/NACK) in the HARQ process via the uplink channel (such as the PUCCH: Physical Uplink Control Channel or the PUSCH: Physical Uplink Shared Channel).

(Operations of Mobile Communication System According to First Embodiment of the Present Invention)

Operations of the mobile communication system according to the first embodiment of the present invention will be described with reference to FIG. 4 to FIG. 12.

First, operations of the radio base station eNB according to this embodiment will be described with reference to FIG. 4 to FIG. 9.

Figure 4:
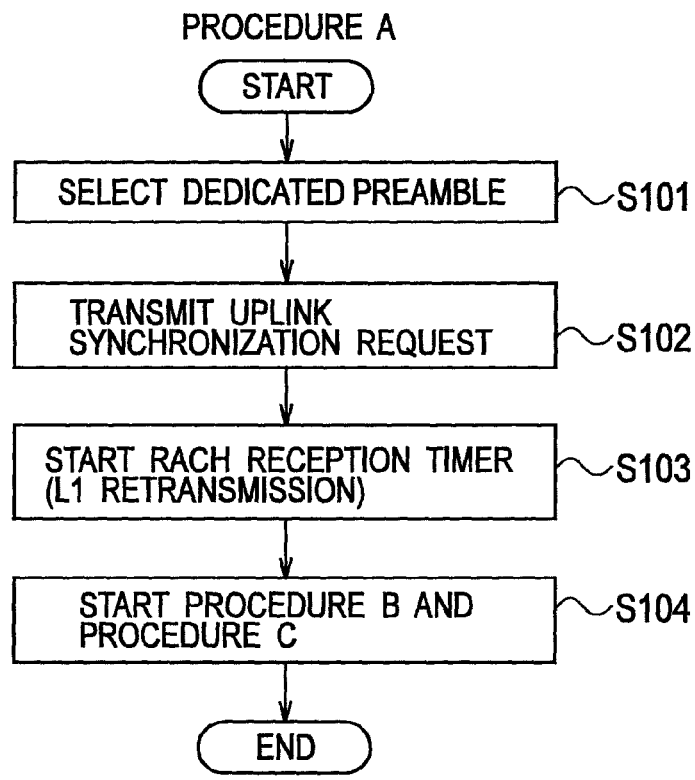
FIG. 4 is a flowchart showing operations in a procedure A performed by the radio base station according to the first embodiment of the present invention.

As shown in FIG. 4, when the radio base station eNB starts a procedure A, the RACH manager unit 14 selects a dedicated preamble for the mobile station UE from a group of stored preambles in Step S101.

In Step S102, the MAC-PDU generator unit 16 generates a MAC-PDU containing an uplink synchronization request that designates the dedicated preamble for the mobile station UE and the transmitter unit 17 transmits the MAC-PDU to the mobile station UE by using the DL-DCH.

In Step S103, the RACH manager unit 14 starts a RACH reception timer (L1 retransmission). In Step S104, the radio base station eNB starts a procedure B and a procedure C.

Figure 5:
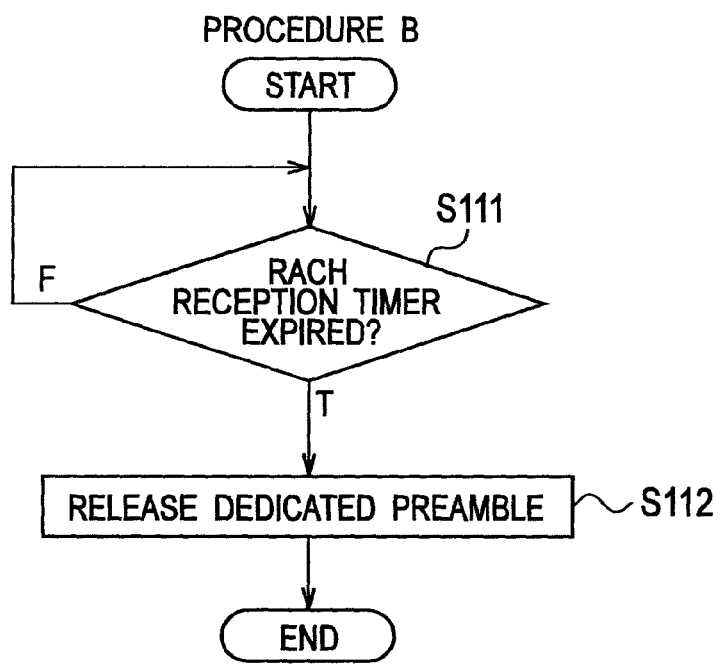
FIG. 5 is a flowchart showing operations in a procedure B performed by the radio base station according to the first embodiment of the present invention.

As shown in FIG. 5, when the radio base station eNB starts the procedure B, the RACH manager 14 determines whether or not the RACH reception timer (L1 retransmission) has expired in Step S111. Here, the RACH reception timer (L1 retransmission) may be defined by time or may be defined by the number of times of retransmission of the dedicated preamble using the asynchronous RACH.

When determining that the RACH reception timer (L1 retransmission) has expired, in Step S112, the RACH manager unit 14 releases the dedicated preamble allocated to the mobile station UE.

As shown in FIG. 6, when the radio base station eNB starts the procedure C, the RACH manager unit 14 performs preamble detection processing in Step S121, and determines whether or not to detect the dedicated preamble for the mobile station UE in Step S122.

When determining that the dedicated preamble for the mobile station UE is not detected, the RACH manager unit 14 determines whether or not the RACH reception timer (L1 retransmission) has expired in Step S123.

The operation returns to Step S121 when the RACH manager unit 14 determines that the RACH reception timer (L1 retransmission) has expired. By contrast, the operation returns to Start of the procedure A when the RACH manager unit 14 determines that the RACH reception timer (L1 retransmission) has expired.

On the other hand, when the RACH manager unit 14 determines that the dedicated preamble for the mobile station UE is detected, the transmission timing manager unit 15 detects the reception timing of the dedicated preamble in Step S124.

In Step S125, the transmission timing manager unit 15 creates a TA command in response to the reception timing of the dedicated preamble, the MAC-PDU generator unit 16 generates a MAC-PDU containing the created TA command, and the transmitter unit 17 transmits the MAC-PDU by using the downlink data channel.

In Step S126, the scheduler unit 16a starts a transmission restart determination timer. The RACH manager unit 14 performs preamble detection processing in Step S127, and determines whether or not to detect a dedicated preamble for the mobile station UE in Step S128.

When the RACH manager unit 14 determines that the dedicated preamble for the mobile station UE is detected, the scheduler unit 16a stops the transmission restart determination timer in Step S129.

On the other hand, when the RACH manager unit 14 determines that the dedicated preamble for the mobile station UE is not detected, in Step S130, the scheduler unit 16a determines whether or not the transmission restart determination timer has expired.

The radio base station eNB starts a procedure D and a procedure E in Step S131, when the scheduler unit 16a determines that the transmission restart determination timer has expired. By contrast, the operation returns to Step S127 when the scheduler unit 16a determines that the transmission restart determination timer has not expired.

Figure 7:
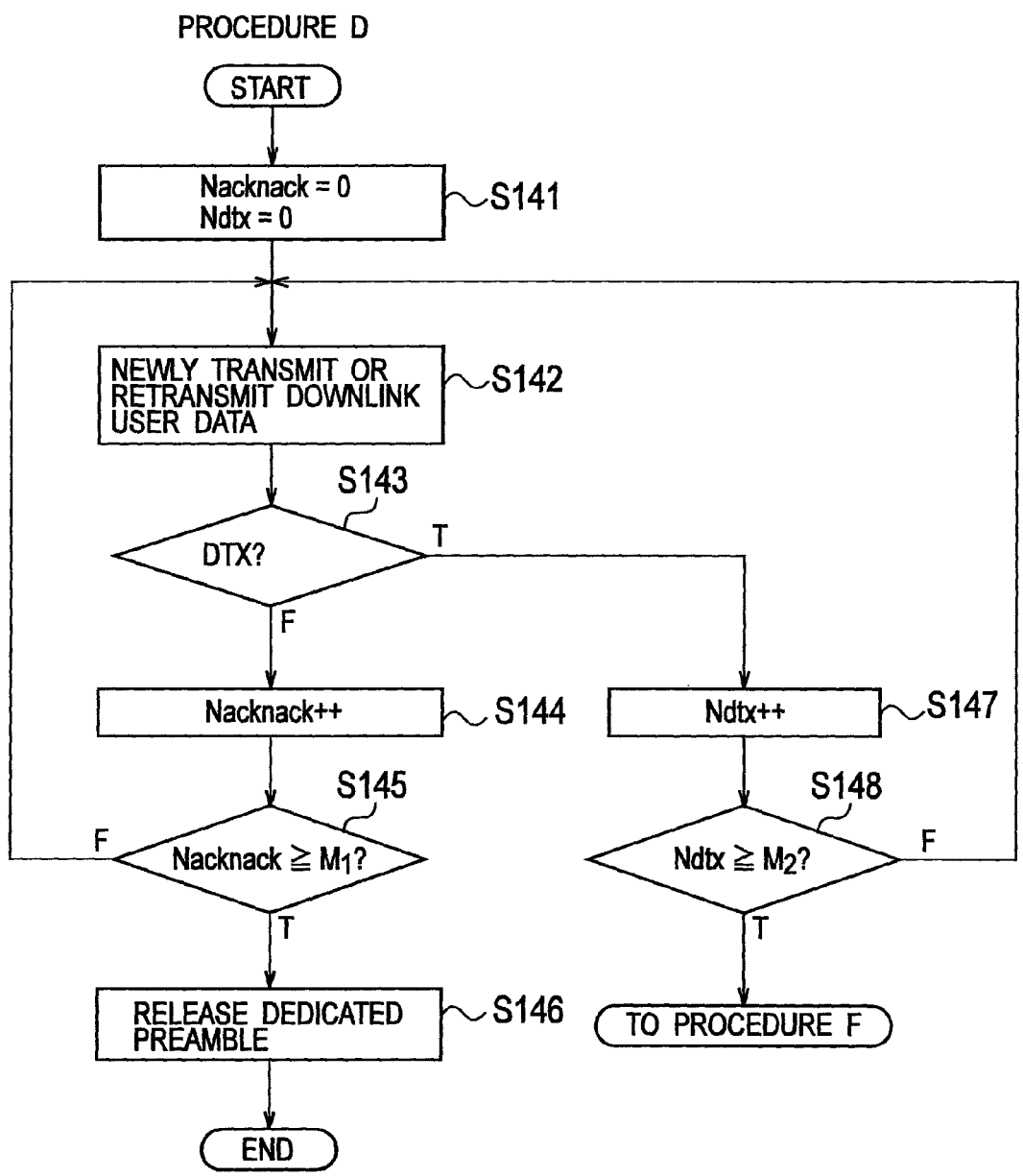
FIG. 7 is a flowchart showing operations in a procedure D performed by the radio base station according to the first embodiment of the present invention.

As shown in FIG. 7, when the radio base station eNB starts the procedure D, parameters $N_{acknack}$ and $N_{dtx}$ are initialized in Step S141.

In Step S142, the MAC-PDU generator unit 16 generates a MAC-PDU containing downlink user data in the radio subframe to which the transmission opportunity is allocated by the scheduler unit 16a, and the transmitter unit 17 restarts new transmission or retransmission of the MAC-PDU via the downlink data channel.

In Step S143, the HARQ manager unit 13 monitors the transmission acknowledgment information (ACK/NACK) in the HARQ process. When the transmission acknowledgment information (ACK/NACK) in the HARQ process is received, $N_{acknack}$ is incremented by only one in Step S144. When the transmission acknowledgment information (ACK/NACK) in the HARQ process is not received (in the case of being in the DTX state), $N_{dtx}$ is incremented by only one in Step S147.

Here, $N_{acknack}$ may be incremented by only one in Step S144 when the transmission acknowledgment information in the HARQ process is consecutively received, and $N_{dtx}$ may be incremented by only one in Step S147 when the transmission acknowledgment information in the HARQ process is not received consecutively (in the case of being in the DTX state).

In Step S145, a determination is made as to whether or not $N_{acknack}$ is equal to or above a predetermined threshold $M_1$. The RACH manager unit 14 releases the dedicated preamble allocated to the mobile station UE, when $N_{acknack}$ is determined to be equal to or above the predetermined threshold $M_1$. The operation returns to Step S142, when $N_{acknack}$ is determined not to be equal to or above the predetermined threshold $M_1$.

Meanwhile, in Step S148, a determination is made as to whether or not $N_{dtx}$ is equal to or above a predetermined threshold $M_2$. The operation proceeds to Start of a procedure F, when $N_{dtx}$ is determined to be equal to or above the predetermined threshold $M_2$. Meanwhile, the operation returns to Step S142, when $N_{dtx}$ is determined not to be equal to or above the predetermined threshold $M_2$.

Figure 8:
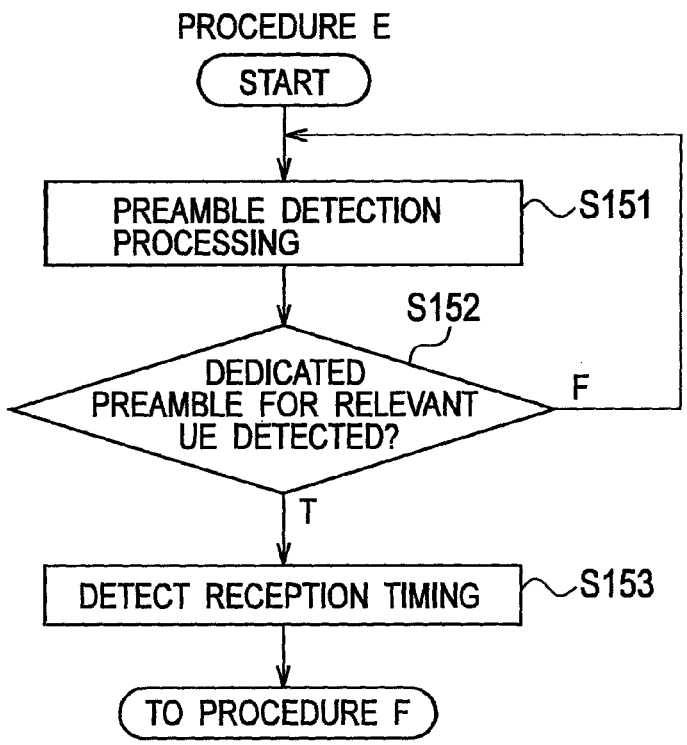
FIG. 8 is a flowchart showing operations in a procedure E performed by the radio base station according to the first embodiment of the present invention.

As shown in FIG. 8, when the radio base station eNB starts the procedure E, the RACH manager unit 14 performs preamble detection processing in Step S151, and determines whether or not to detect the dedicated preamble for the mobile station UE in Step S152.

When the RACH manager unit 14 determines that the dedicated preamble for the mobile station UE is detected, the transmission timing manager unit 15 detects the reception timing of the dedicated preamble for the mobile station UE in Step S153. Then, the operation proceeds to Start of the procedure F.

On the other hand, the operation returns to Step S151, when the RACH manager unit 14 determines that the dedicated preamble for the mobile station UE is not detected.

Figure 9:
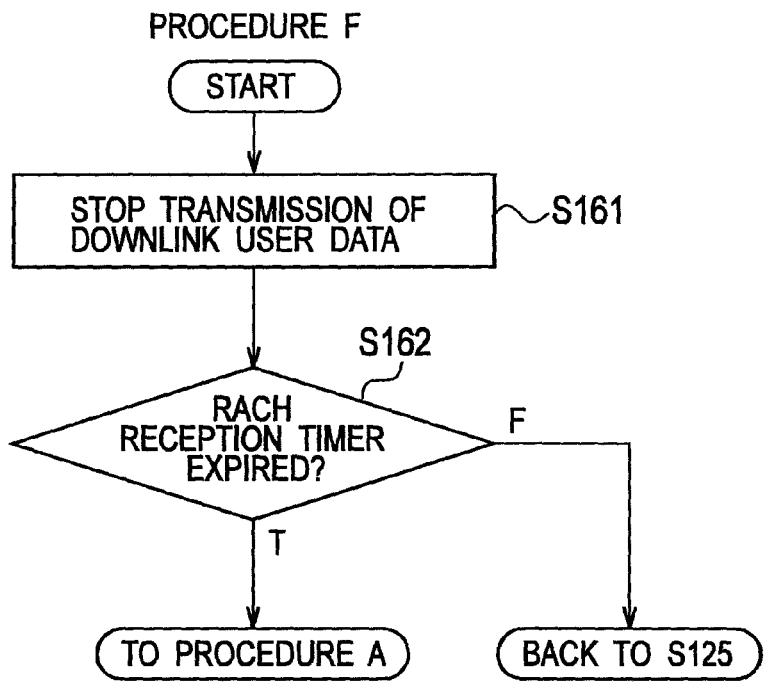
FIG. 9 is a flowchart showing operations in a procedure F performed by the radio base station according to the first embodiment of the present invention.

As shown in FIG. 9, when the radio base station eNB starts the procedure F, the generation processing of a MAC-PDU containing downlink user data performed by the MAC-PDU generator unit 16 and the transmission processing of the MAC-PDU performed by the transmitter unit 17 are stopped in Step S161.

In Step S162, a determination is made as to whether or not the RACH reception timer has expired. The operation returns to Start of the procedure A when the RACH reception timer is determined to have expired. By contrast, the operation returns to Step S125 of the procedure C when the RACH reception timer is determined not to have expired.

Second, operations of the mobile station UE according to this embodiment will be described with reference to FIG. 10 to FIG. 12.

Figure 10:
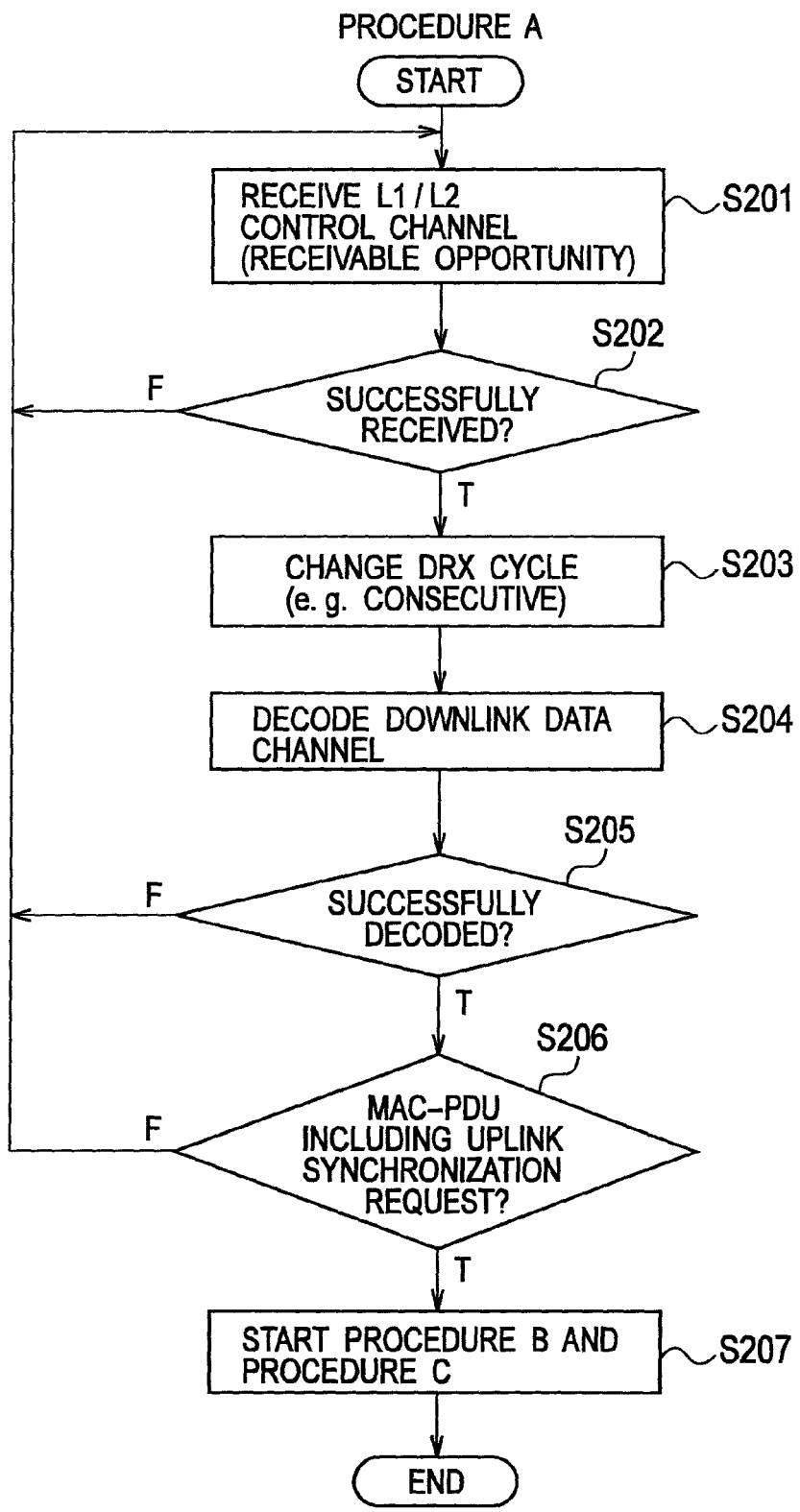
FIG. 10 is a flowchart showing operations in a procedure A performed by the mobile station according to the first embodiment of the present invention.

As shown in FIG. 10, when the mobile station UE in the DRX state starts the procedure A, the receiver unit 31 receives the L1/L2 control channel at a receivable opportunity (a DRX cycle) of the mobile station UE in Step S201.

When the receiver unit 31 successfully receives the L1/L2 control channel in Step S202, in Step S203, the L1/L2 control information processor unit 32 changes the DRX cycle (changing a reception state of the mobile station UE to a consecutive reception state or shortening the DRX cycle, for example) in accordance with the L1/L2 control information (the radio resource notification control information) transmitted via the L1/L2 control channel.

On the other hand, the operation returns to Step S201, when the receiver unit 31 fails to receive the L1/L2 control channel in Step S202.

In Step S204, the receiver unit 31 decodes the downlink data channel received at the receivable opportunity of the mobile station UE. The operation proceeds to Step S206 when the decoding is successful. By contrast, the operation returns to Step S201 when the decoding is failed (Step S205).

In Step S206, the MAC-PDU analyzer unit 34 determines whether or not the MAC-PDU, which is transmitted via the downlink data channel that is successfully decoded, contains the uplink synchronization request.

When the MAC-PDU analyzer unit 34 determines that the uplink synchronization request is contained, the mobile station UE starts a procedure B and a procedure C in Step S207. By contrast, the operation returns to Step S201 when the MAC-PDU analyzer unit 34 determines that the uplink synchronization request is not contained.

Figure 11:
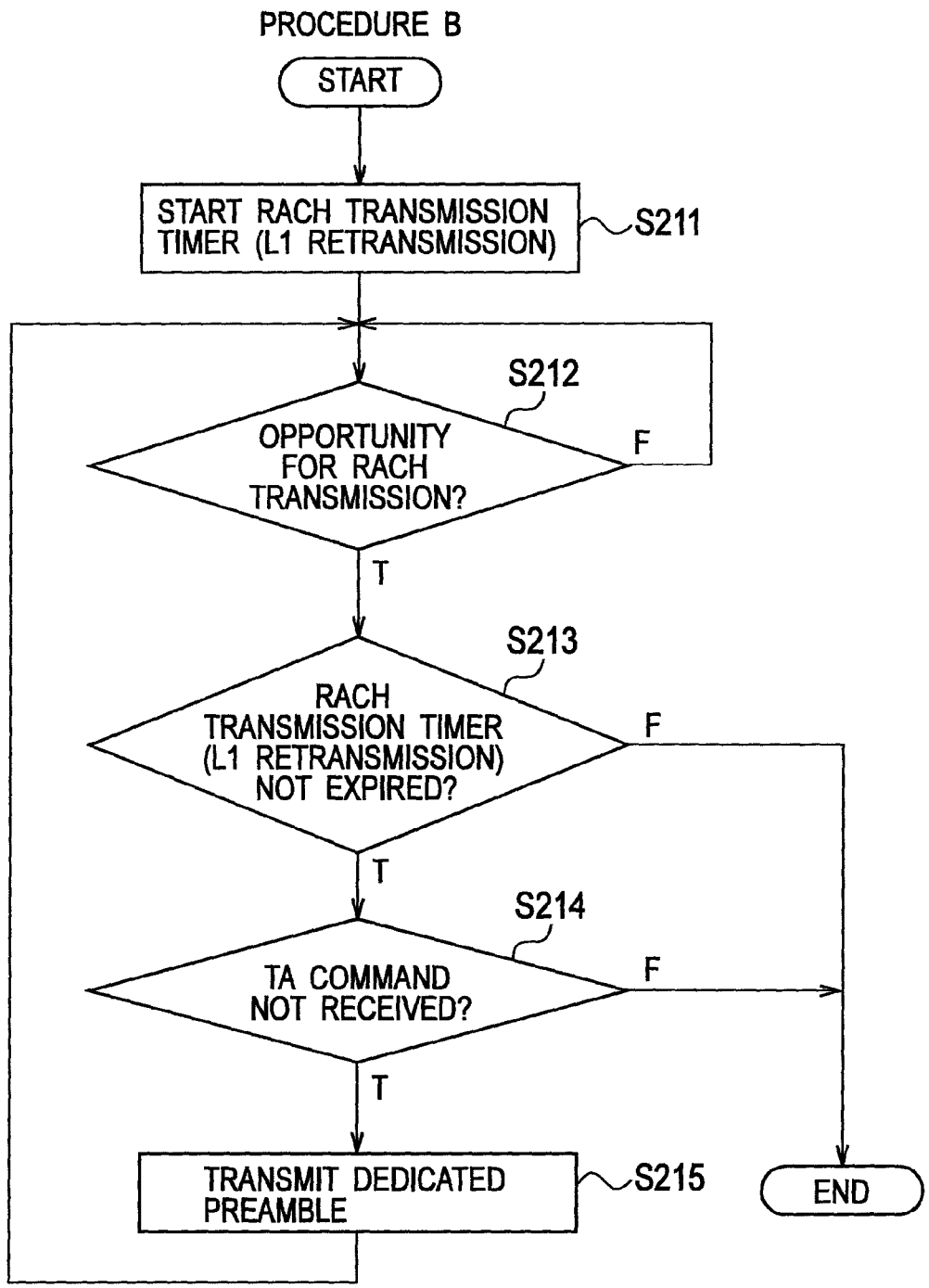
FIG. 11 is a flowchart showing operations in a procedure B performed by the mobile station according to the first embodiment of the present invention.

As shown in FIG. 11, when the mobile station UE starts the procedure B, a RACH transmission timer (L1 retransmission) is started in Step S211, and the RACH transmission manager unit 36 determines whether or not it is an opportunity for the mobile station UE to transmit the asynchronous RACH in Step S212.

When determining that it is the opportunity, the RACH transmission manager unit 36 determines whether or not the RACH transmission timer (L1 retransmission) has expired in Step S213.

When determining that the RACH transmission timer (L1 retransmission) has not expired, the RACH transmission manager unit 36 determines whether or not the TA command is received in Step S214. On the other hand, the operation is terminated when the RACH transmission manager unit 36 determines that the RACH transmission timer (L1 retransmission) has expired.

When determining that the TA command is not received in Step S214, the RACH transmission manager unit 36 transmits the dedicated preamble using the asynchronous RACH by way of the transmitter unit 38. On the other hand, the operation is terminated when the RACH transmission manager unit 36 determines that the TA command is received.

Figure 12:
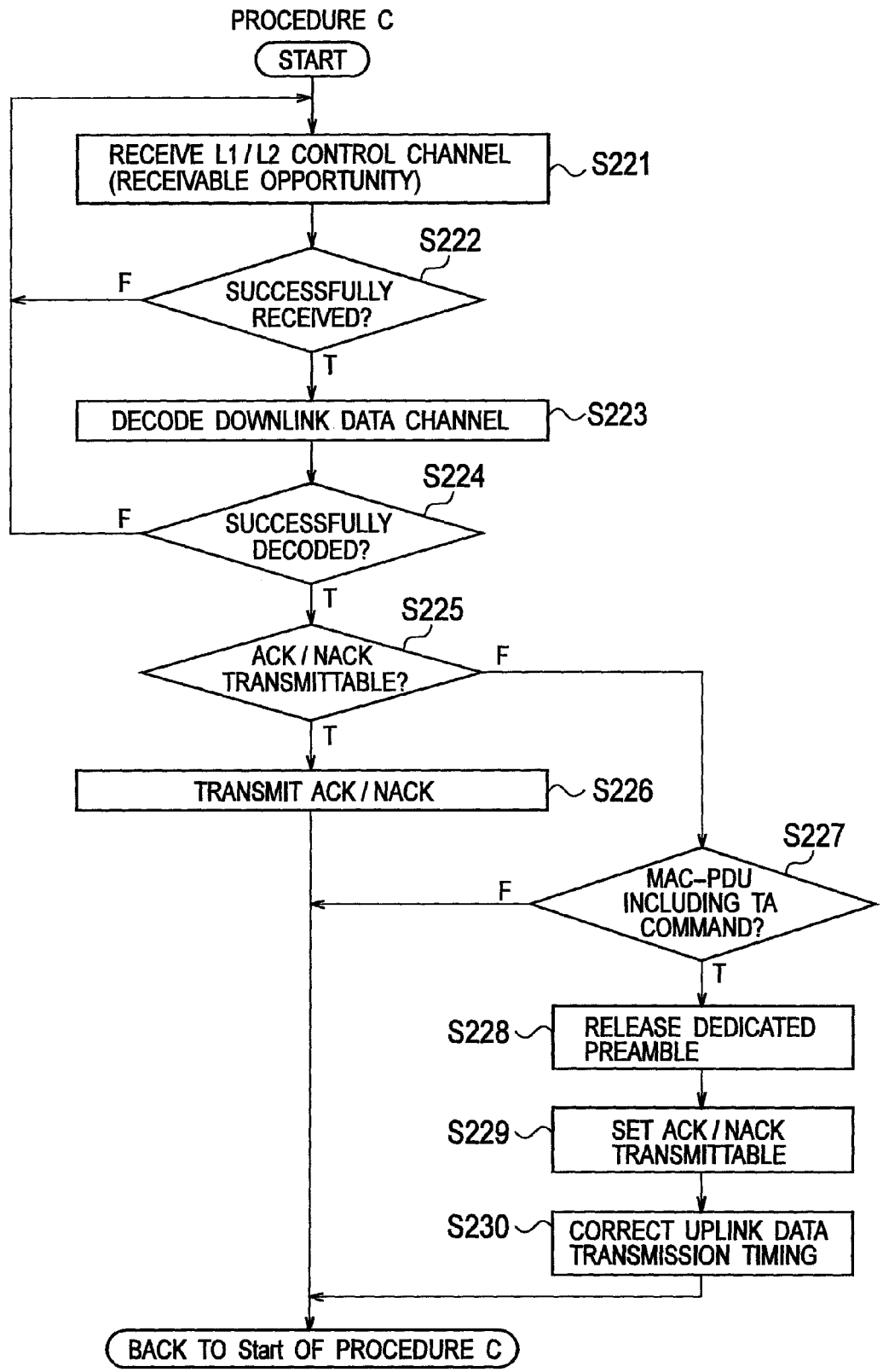
FIG. 12 is a flowchart showing operations in a procedure C performed by the mobile station according to the first embodiment of the present invention.

As shown in FIG. 12, when the mobile station UE starts the procedure C, the receiver 31 receives the L1/L2 control channel at the receivable opportunity (the DRX cycle) of the mobile station UE in Step S221.

When the receiver unit 31 successfully receives the L1/L2 control channel in Step S222, the downlink data channel received at the receivable opportunity of the mobile station UE is decoded in Step S223. The operation proceeds to Step S225 when the decoding is successful, whereas the operation returns to Step S221 when the decoding is failed (Step S224).

On the other hand, the operation returns to Step S221 when the receiver unit 31 fails to receive the L1/L2 control channel in Step S222.

In Step S225, the HARQ transmission manager unit 35 determines whether or not it is set up so as to allow transmission of the transmission acknowledgment signal (ACK/NACK) in the HARQ process.

When a determination is made that it is set up so as to allow transmission of the transmission acknowledgment signal (ACK/NACK) in the HARQ process, in Step S226, the HARQ transmission manager unit 35 transmits ACK/NACK for the MAC-PDU, which is contained in the downlink data channel having been successfully decoded, by way of the transmitter unit 38.

On the other hand, when a determination is made that it is not set up so as to allow transmission of the transmission acknowledgment signal (ACK/NACK) in the HARQ process, the RACH transmission manager unit 36 determines whether or not the MAC-PDU contained in the downlink data channel successful decoded includes the TA command in Step S227.

When determining that the TA command is included, the RACH transmission manager unit 36 releases the dedicated preamble for the mobile station UE allocated by the radio base station eNB in Step S228. In Step S229, the HARQ transmission manager unit 35 set up so as to allow transmission of the transmission acknowledgment signal (ACK/NACK) in the HARQ process. In Step S230, the transmission timing controller unit 37 corrects the uplink transmission timing in accordance with the received TA command.

(Operation and Effect of Mobile Communication System According to First Embodiment of the Present Invention)

According to the mobile communication system of the first embodiment of the present invention, transmission of the downlink user data can be started after a lapse of the predetermined period from transmission of the TA command when transmission of the downlink user data to the mobile station UE in the DRX state (the discontinuous reception state) is restarted. Thereafter, when the predetermined condition is detected, it is possible to determine that uplink synchronization is not established and to restart processing to establish uplink synchronization again. Therefore, transmission of the downlink user data to the mobile station UE in the DRX state (the discontinuous reception state) can be restarted promptly.

MODIFIED EXAMPLE 1

A mobile communication system according to Modified example 1 will be described with reference to FIG. 13 and FIG. 14. In the following, the mobile communication system according to Modified example 1 will be described mainly based on differences from the mobile communication system according to the above-described first embodiment.

In the above-described first embodiment, description has been given of the example of the case where uplink synchronization is not established when transmission of the downlink user data to the mobile station UE in the DRX state (the discontinuous reception state) is restarted. However, the present invention is not limited to this case and is also applicable to a case where uplink synchronization is established when transmission of the downlink user data to the mobile station UE in the DRX state (the discontinuous reception state) is restarted.

Operations for restarting transmission of the downlink user data to the mobile station UE in the DRX state (the discontinuous reception state) in the mobile communication system according to Modified example 1 will be described with reference to FIG. 13 and FIG. 14. Here, uplink synchronization is assumed to be established.

Figure 13:
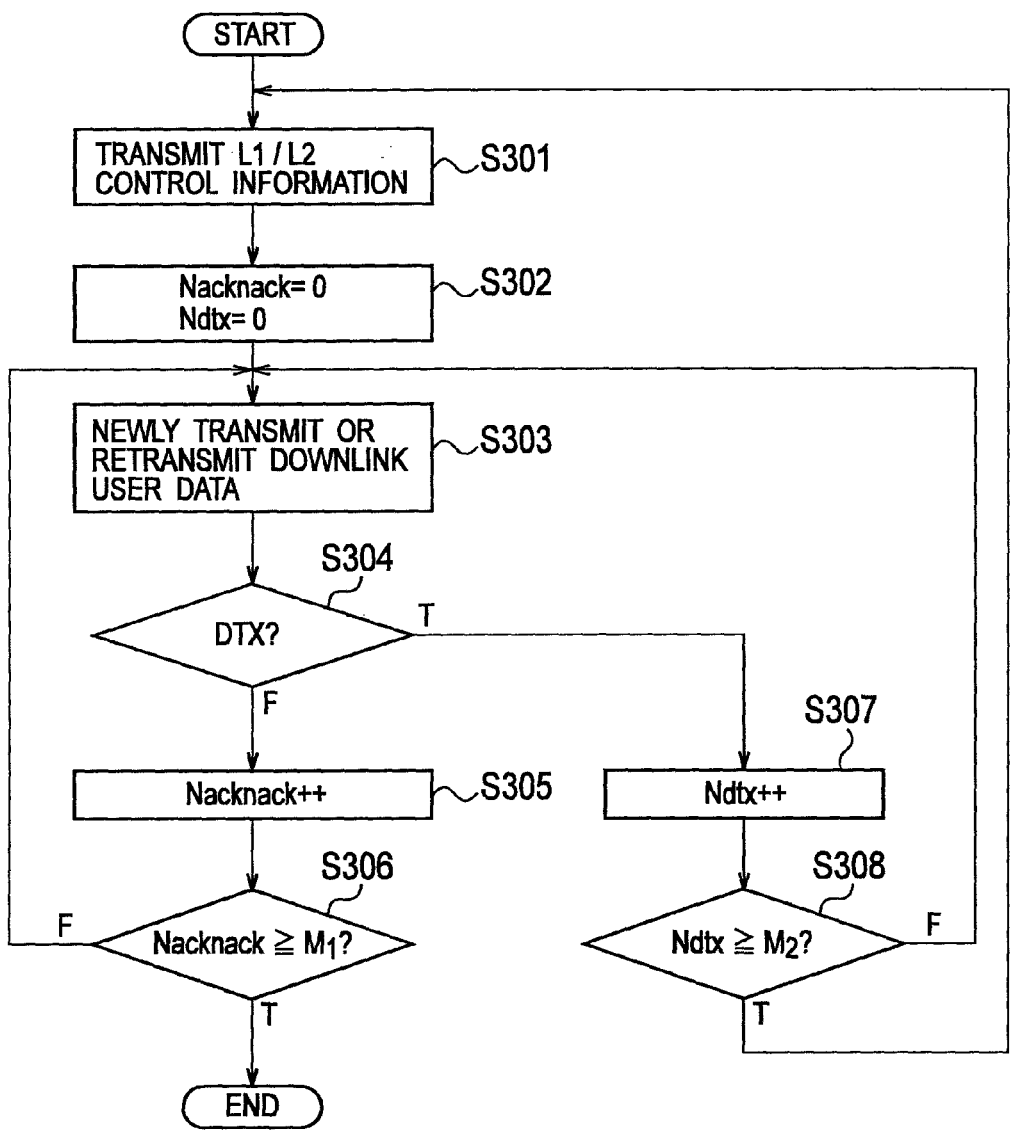
FIG. 13 is a flowchart showing operations of a radio base station according to Modified example 1 of the present invention.

As shown in FIG. 13 and FIG. 14, in Step S301, the radio base station eNB allocates a radio resource for downlink data transmission to the mobile station UE. Then, the radio base station eNB transmits radio resource notification control signal (L1/L2 control information) for notifying of the radio resource for downlink data transmission at timing of discontinuous reception executed by the mobile station UE (at the DRX cycle).

In Step S302, the radio base station eNB initializes parameters $N_{acknack}$ and $N_{dtx}$.

In Step S303, the radio base station eNB generates a MAC-PDU containing downlink user data in a radio subframe to which the transmission opportunity is allocated by the scheduler unit 16a, and restarts new transmission or retransmission of the MAC-PDU via the downlink data channel (DL-SCH).

In Step S304, the radio base station eNB monitors transmission acknowledgment information (ACK/NACK) in the HARQ process. When the radio base station eNB receives the transmission acknowledgment information (ACK/NACK) in the HARQ process, $N_{acknack}$ is incremented by only one in Step S305. When the radio base station eNB does not receive the transmission acknowledgment information in the HARQ process (in the case of being in the DTX state), $N_{dtx}$ is incremented by only one in Step S307.

Here, $N_{acknack}$ may be incremented by only one in Step S305 when the radio base station eNB consecutively receives the transmission acknowledgment information in the HARQ process, and $N_{dtx}$ may be incremented by only one in Step S307 when the radio base station eNB does not consecutively receive the transmission acknowledgment information in the HARQ process (in the case of being in the DTX state).

In Step S306, a determination is made as to whether or not $N_{acknack}$ is equal to or above the predetermined threshold $M_1$. The restart of transmission of the downlink user data is normally completed, when $N_{acknack}$ is determined to be equal to or above the predetermined threshold $M_1$. The operation returns to Step S303, when $N_{acknack}$ is determined not to be equal to or above the predetermined threshold $M_1$.

Meanwhile, in Step S308, a determination is made as to whether or not $N_{dtx}$ is equal to or above the predetermined threshold $M_2$. The operation returns to Step S301 when $N_{dtx}$ is determined to be equal to or above the predetermined threshold $M_2$. The operation returns to Step S303 when $N_{dtx}$ is determined not to be equal to or above the predetermined threshold $M_2$.

The present invention has been explained in detail by using the above-described embodiment. However, it is obvious to those skilled in the art that the present invention is not limited to the embodiment described herein. The present invention can be implemented as modified and corrected forms without departing from the spirit and scope of the present invention to be defined by the appended claims. Therefore, it is to be understood that the description herein is for illustrative purposes only and therefore does not intend to limit the present invention whatsoever.

It is to be understood that the entire contents of Japanese Patent Application No. 2007-077973 (filed on Mar. 23, 2007) are incorporated herein by reference.

Industrial Applicability

As described above, the present invention can provide a transmission restarting method and a radio base station which enable restart of transmission of downlink user data to a mobile station in a discontinuous reception state. Hence the invention is useful for radio communication such as mobile communication.

The invention claimed is:

1. A transmission restarting method of restarting transmission of downlink user data to a mobile station in a discontinuous reception state, comprising the steps of:
   allocating, at a radio base station, a radio resource for downlink data transmission to the mobile station, and notifying, from the radio base station to the mobile station, the allocated radio resource for downlink data transmission;
   restarting, at the radio base station, transmission of downlink user data to the mobile station by using the allocated radio resource for downlink data transmission;
   stopping, at the radio base station, transmission of the downlink user data when a predetermined condition is detected;
   transmitting, from the radio base station to the mobile station, an uplink synchronization request by using the allocated radio resource for downlink data transmission, the uplink synchronization request designating a data series allocated for identifying the mobile station;
   notifying, from the mobile station to the radio base station, the data series designated by the uplink synchronization request, when successfully receiving the uplink synchronization request;
   transmitting, from the radio base station to the mobile station, a command for adjusting uplink transmission timing by using the allocated radio resource for downlink data transmission when receiving the data series from the mobile station;
   restarting, at the radio base station, transmission of the downlink user data to the mobile station by using the allocated radio resource for downlink data transmission, when not receiving the data series from the mobile station until a predetermined period is passed after transmission of the command; and
   stopping, at the radio base station, transmission of the downlink user data, and transmitting, at the radio base station, any of the uplink synchronization request and the command when the predetermined condition is detected.

2. The transmission restarting method according to claim 1, wherein
   the radio base station determines that the predetermined condition is detected, when the data series is received from the mobile station after restart of transmission of the downlink user data.

3. The transmission restarting method according to claim 1, wherein
   the radio base station stops transmission of the downlink user data and transmits the command, when the predetermined condition is detected and when a predetermined timer has not expired.

4. The transmission restarting method according to claim 1, wherein
   the radio base station stops transmission of the downlink user data and transmits the uplink synchronization request, when the predetermined condition is detected and when a predetermined timer has expired.

5. The transmission restarting method according to claim 1, wherein
   the data series is a preamble for a random access channel; and
   the mobile station notifies, to the radio base station, the preamble designated by the uplink synchronization request by using the random access channel, when successfully receiving the uplink synchronization request.

6. A radio base station configured to restart transmission of downlink user data to a mobile station in a discontinuous reception state, wherein the radio base station is configured to:
   allocate a radio resource for downlink data transmission to the mobile station, and notify, to the mobile station, the allocated radio resource for downlink data transmission;
   restart transmission of downlink user data to the mobile station by using the allocated radio resource for downlink data transmission;
   stop transmission of the downlink user data, when a predetermined condition is detected;
   transmit, to the mobile station, an uplink synchronization request by using the allocated radio resource for downlink data transmission, the uplink synchronization request designating a data series allocated for identifying the mobile station;
   transmit, to the mobile station, a command for adjusting uplink transmission timing by using the allocated radio resource for downlink data transmission, when receiving the data series from the mobile station;
   restart transmission of the downlink user data to the mobile station by using the allocated radio resource for downlink data transmission, when not receiving the data series from the mobile station until a predetermined period is passed after transmission of the command; and
   stop transmission of the downlink user data, and transmit any of the uplink synchronization request and the command, when the predetermined condition is detected.

7. The radio base station according to claim 6, wherein
   the radio base station is configured to determine that the predetermined condition is detected, when the data series is received from the mobile station after restart of transmission of the downlink user data.

8. The radio base station according to claim 6, wherein
   the radio base station is configured to stop transmission of the downlink user data, and to transmit the command, when the predetermined condition is detected and when a predetermined timer has not expired.

9. The radio base station according to claim 6, wherein the radio base station is configured to stop transmission of the downlink user data, and to transmit the uplink synchronization request, when the predetermined condition is detected and when a predetermined timer has expired.

10. The radio base station according to claim 6, wherein the data series is a preamble for a random access channel.

* * * * *